July 6, 1937.  F. BLACK  2,085,724

HANDLING MECHANISM FOR STORAGE BATTERY CONTAINERS

Filed Nov. 30, 1935  2 Sheets-Sheet 1

WITNESS:

INVENTOR
Frederick Black
BY
Augustus B. Stoughton.
ATTORNEY.

July 6, 1937.  F. BLACK  2,085,724

HANDLING MECHANISM FOR STORAGE BATTERY CONTAINERS

Filed Nov. 30, 1935    2 Sheets-Sheet 2

WITNESS:
Rob't R. Mitchell

INVENTOR
Frederick Black
BY
Augustus B. Stoughton.
ATTORNEY.

Patented July 6, 1937

2,085,724

UNITED STATES PATENT OFFICE 2,085,724

HANDLING MECHANISM FOR STORAGE BATTERY CONTAINERS

Frederick Black, Philadelphia, Pa., assignor to The Electric Storage Battery Company, Philadelphia, Pa., a corporation of New Jersey Application November 30, 1935, Serial No. 52,283

5 Claims. (Cl. 16—114)

The principal object of the present invention is to provide a storage battery container for railway car use. The requirements include that the container shall occupy no more space than is necessary; that the container, when empty, can be easily lifted and transported; that the container, when in use, shall have provisions by which it can be manually up-ended and dragged and lifted; and it is important that these provisions shall not occupy space in the battery box and shall not interfere with closing the same.

It is a further object of the invention to provide a receptacle which shall possess the advantage of meeting the requirements indicated.

Other objects of the invention will appear from the following description at the end of which the invention will be claimed.

Generally stated, the invention comprises corner end and side lugs disposed, the end lugs at a higher level than the side lugs, in association with a yoke shaped handle having its shanks provided with hooks and having a cross bar adapted to take under the end lugs and the shanks adapted to take over the side lugs for up-ending the container and for affording gravity detachment of the handle, and the hooks adapted to engage the side lugs for skidding the container by the handle.

The invention also comprises the improvements to be presently described and finally claimed.

In the following description reference will be made to the accompanying drawings forming part hereof and in which, Figure 1 is a top or plan view showing the handle in application to the container.

Figure 1:
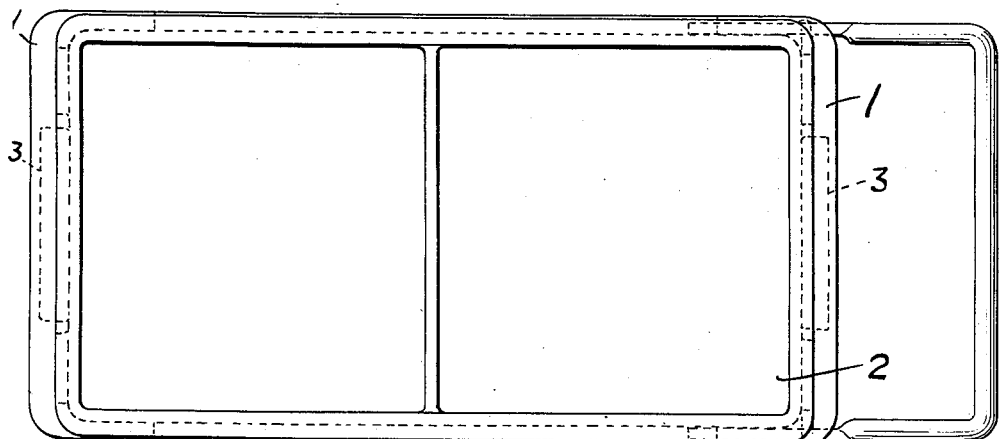

Referring to the drawings, the projecting ribs 1 at the ends of the open top rectangular container 2 are provided on their under faces with space 3 for a hand-hold. The container at its corners is provided with end lugs 4 spaced to provide access to the hand-hold 3. At its corners the container is also provided with side lugs 5 disposed at a lower level than the end lugs 4. The handle 6 is yoke shaped and its shanks 7 are shown as flattened and provided with hooks 8. The handle is also equipped with a cross bar 9 connecting the shanks of the handle.

Figure 2:
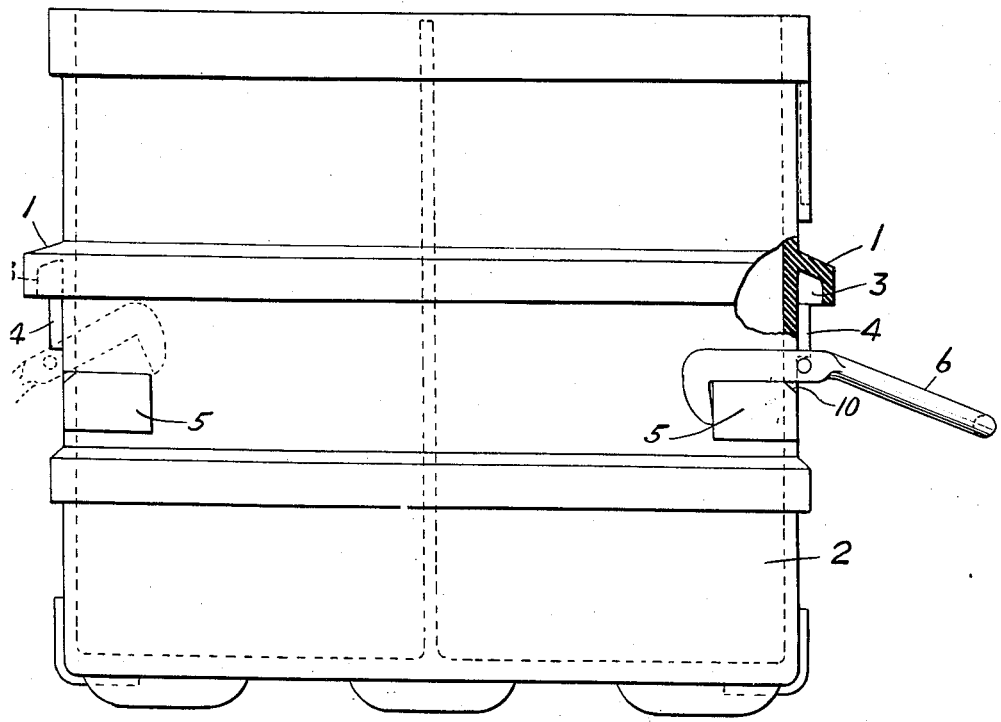
Figure 2 is a side view with parts broken away also showing the handle which, if free, would not remain in the position indicated.
Figure 3:
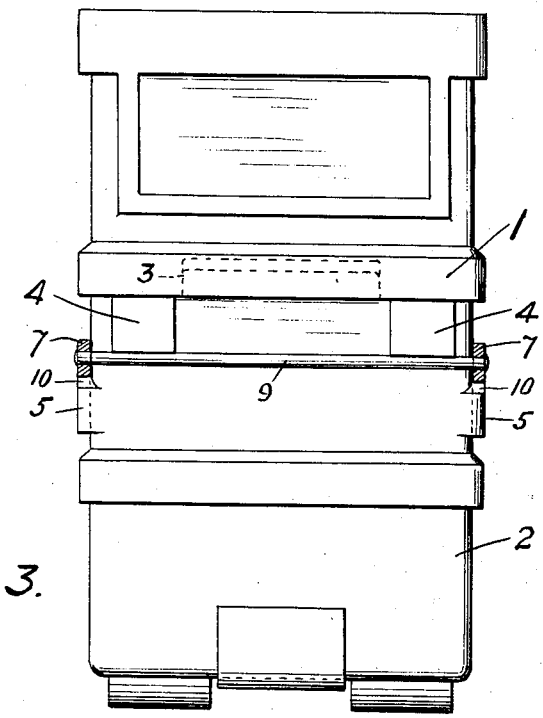
Figure 3 is an end view showing the shanks of the handle in section.
Figure 4:
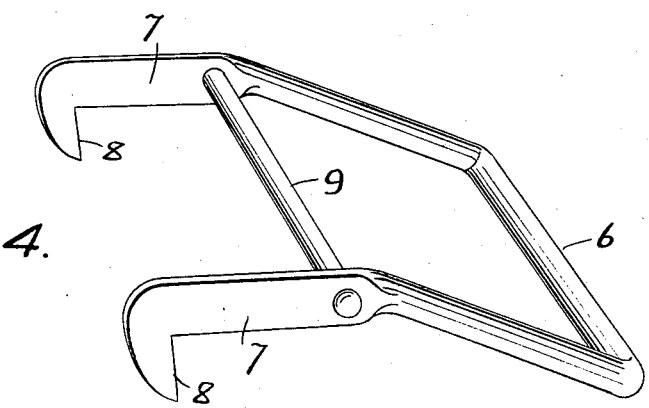
Figure 4 is a perspective view of the handle detached.

When the container 2 is empty the hand holes 3 afford a convenient means for lifting. However, when the electrolyte and battery electrodes are arranged in the container the assemblage is quite heavy and in railway use it is transferred from battery boxes to platforms and trucks and is otherwise transported. For this purpose the detachable handle 6 is provided and when applied to the container, as shown in Figure 2, the bar 9 and the shanks 7 cooperate when the container is up-ended and the hooks 8 cooperate with the lugs 5 when the container is dragged or skidded. When released from the hand the handle falls clear of the container and this has merit because it ensures that the handle shall not be put into the battery box or compartments where there is no room for it. It is a feature of the invention that the containers take up as little room in the battery box or compartment as possible. The application of the handle to the container is facilitated by the beveled portions 10 of the lugs 5 which serve in cooperation with the backs of the hooks to guide the handle into place on the container.

It will be obvious to those skilled in the art that modifications may be made in details of construction and in matters of mere form without departing from the spirit of the invention which is not limited to such matters or otherwise than as the prior art and the appended claims may require.

I claim:

1. A rectangular storage battery container for railway car use having at its corners end and side lugs disposed the end lugs at a higher level than the side lugs, in combination with a yoke shaped handle having its shanks provided with hooks and having a cross bar extending from side to side of the yoke, the cross bar adapted to take under the end lugs and the shanks adapted to take over the side lugs for up-ending the container and for affording gravity detachment of the handle, and the hooks adapted to engage the side lugs for skidding the container by the handle.

2. A rectangular storage battery container for railway car use having at its corners end and side lugs disposed the end lugs at a higher level than the side lugs, the side lugs beveled at the upper outer end edges, in combination with a yoke shaped handle having its shanks provided with hooks and having a cross bar extending from side to side of the yoke, the cross bar adapted to take under the end lugs and the shanks adapted to take over the side lugs for up-ending the container and for affording gravity detachment of the handle, the hooks adapted to engage the side lugs for skidding the container by the handle, and the beveled edges of the side lugs cooperating with the backs of the hooks to guide the handle to the described position.

3. A rectangular storage battery container for railway car use having at its ends projecting ribs provided on their under faces with space for a hand-hold and having at its corners end and side lugs disposed, the end lugs below the rib and at the sides of the space and the side lugs below the level of the end lugs, in combination with a yoke shaped handle having its shanks provided with hooks and having a cross bar extending across the interior of the yoke, the cross bar adapted to take under the end lugs and the shanks adapted to take over the side lugs for up-ending the container and for affording gravity detachment of the handle to expose said space for hand hold, and the hooks adapted to engage the side lugs for skidding the container by the handle.

4. In combination a rectangular storage battery container having projections from its side walls adjacent one end providing upwardly facing shoulders and a projection from the corresponding end wall providing a downwardly facing shoulder above the level of the first-mentioned shoulders, a detachable handle comprising a yoke-shaped portion of which the middle part is adapted to be grasped by the hand and the shank portions are adapted to contact the side walls and engage the upwardly facing shoulders, hooks on the ends of the shanks adapted to engage the projections from the side walls to prevent forward displacement of the handle, and a straight cross-bar extending across said yoke-shaped portion connecting said shanks to prevent spreading thereof and adapted to engage the downwardly facing shoulder of the end wall projection.

5. In combination, a rectangular storage battery container having projections from its walls whereof at least one is located at the front end and offers downwardly facing shoulders and others are located rearwardly with respect to the first and offer upwardly facing shoulders, and a detachable yoke-shaped handle whereof the middle part is adapted to be grasped by the hand and other parts are adapted for hooking and lifting engagement with said shoulders when said handle projects horizontally from the end of said container.

FREDERICK BLACK.